(12) United States Patent
McKenzie

(10) Patent No.: US 12,515,577 B1
(45) Date of Patent: Jan. 6, 2026

(54) MOTORIZED LIQUID TRANSPORT AND STORAGE TANK FOR A TRANSFER DUMP TRUCK

(71) Applicant: Kevin McKenzie, Gilroy, CA (US)

(72) Inventor: Kevin McKenzie, Gilroy, CA (US)

(73) Assignee: RMC ENGINEERING CO., INC., Gilroy, CA (US)

( * ) Notice: Subject to any disclaimer, the term of this patent is extended or adjusted under 35 U.S.C. 154(b) by 484 days.

(21) Appl. No.: 18/319,375

(22) Filed: May 17, 2023

Related U.S. Application Data

(60) Provisional application No. 63/343,033, filed on May 17, 2022.

(51) Int. Cl.
| | | |
|---|---|---|
| *B65D 88/12* | (2006.01) | |
| *B60P 1/06* | (2006.01) | |
| *B60P 1/28* | (2006.01) | |
| *B60P 3/42* | (2006.01) | |

(52) U.S. Cl.
CPC .......... *B60P 3/426* (2013.01); *B60P 1/06* (2013.01); *B60P 1/283* (2013.01); *B65D 88/128* (2013.01); *B65D 88/129* (2013.01)

(58) Field of Classification Search
CPC ....... B60P 3/426; B60P 3/2255; B60P 3/2215; B60P 1/283; B60P 1/06; B60P 1/12; B65D 88/128; B65D 88/129; B65D 90/0033
See application file for complete search history.

(56) References Cited

U.S. PATENT DOCUMENTS

| | | | |
|---|---|---|---|
| 5,098,019 A | 3/1992 | Landefeld | |
| 5,593,272 A | 1/1997 | Green | |
| 7,290,974 B1 | 11/2007 | Baker et al. | |
| 10,005,383 B2 | 6/2018 | Ellis | |
| 2012/0255957 A1* | 10/2012 | McGowen | B65D 88/12 220/564 |
| 2020/0122623 A1* | 4/2020 | Kuriyagawa | A01D 75/28 |

OTHER PUBLICATIONS

Website page for "2600 Gallon Horizontal Leg Tank", publication date unknown, internet address https://www.tank--depot.com/productdetails.aspx?part=SII-8470000C26.
Website page for "10000L Floodrite Slip On Water Cart", publication date unknown, internet address https://www.tti.com.au/product/floodrite-slip-on-unit-10000-litres/.

* cited by examiner

*Primary Examiner* — Kelsey E Cary
(74) *Attorney, Agent, or Firm* — Adam Warwick Bell; Gregory S. Smith

(57) ABSTRACT

A motorized transfer tank includes an electric motor and related control equipment to enable the transfer tank to propel itself into and out of the dump body of a transfer dump truck without the use of cranes or winches. The motorized transfer tank enables a transfer dump truck equipped for transporting solid payloads to carry liquid payloads safely and economically by loading and unloading the motorized transfer tank from the truck's dump body and/or a transfer trailer by operation of the electric motor and a battery included with the motorized transfer tank. When not being used to transport liquid payloads, the motorized transfer tank may be unloaded from the transfer dump truck and/or the transfer trailer onto a stationary tank stand, allowing the transfer trailer and dump truck to be used for transporting other payloads.

19 Claims, 10 Drawing Sheets

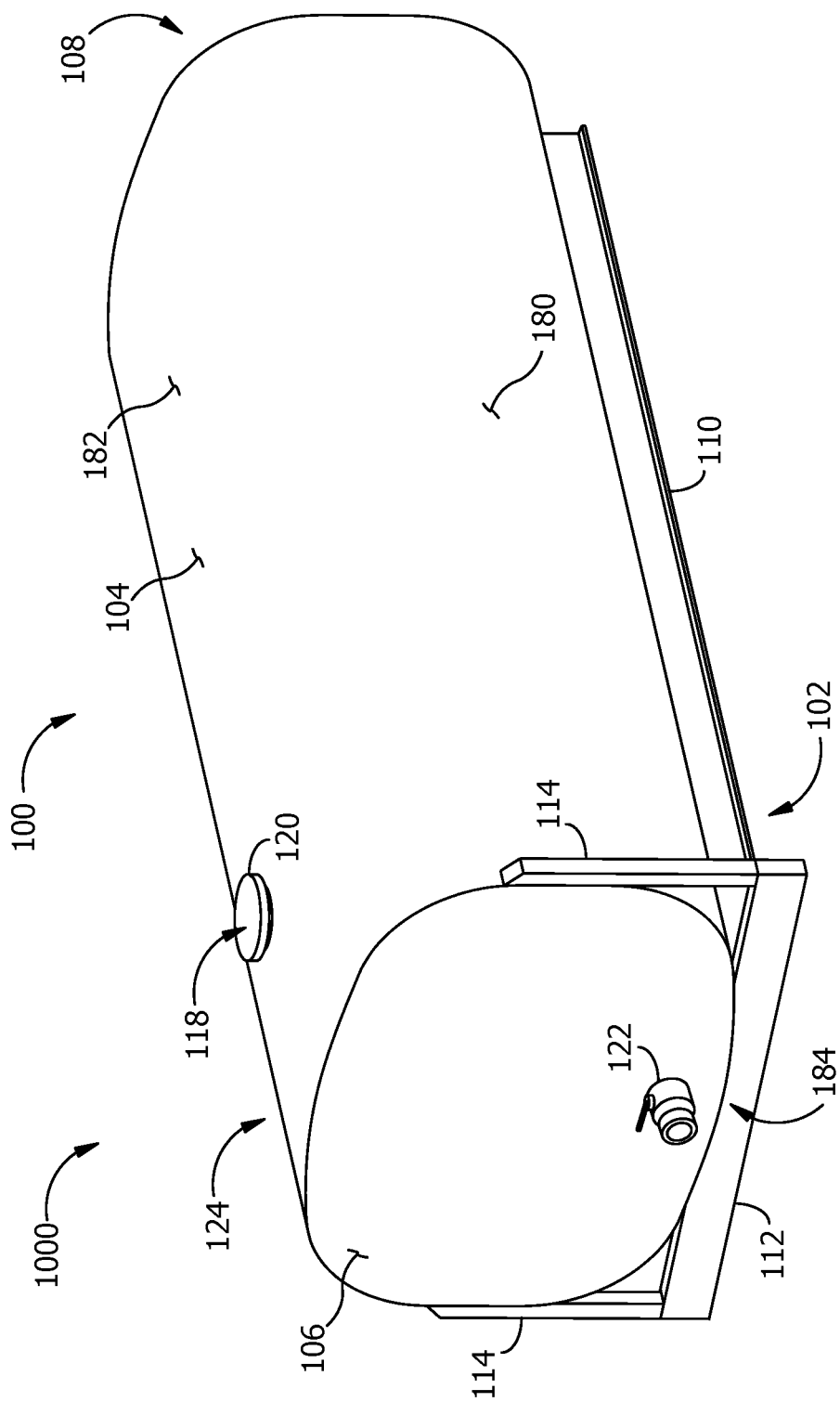

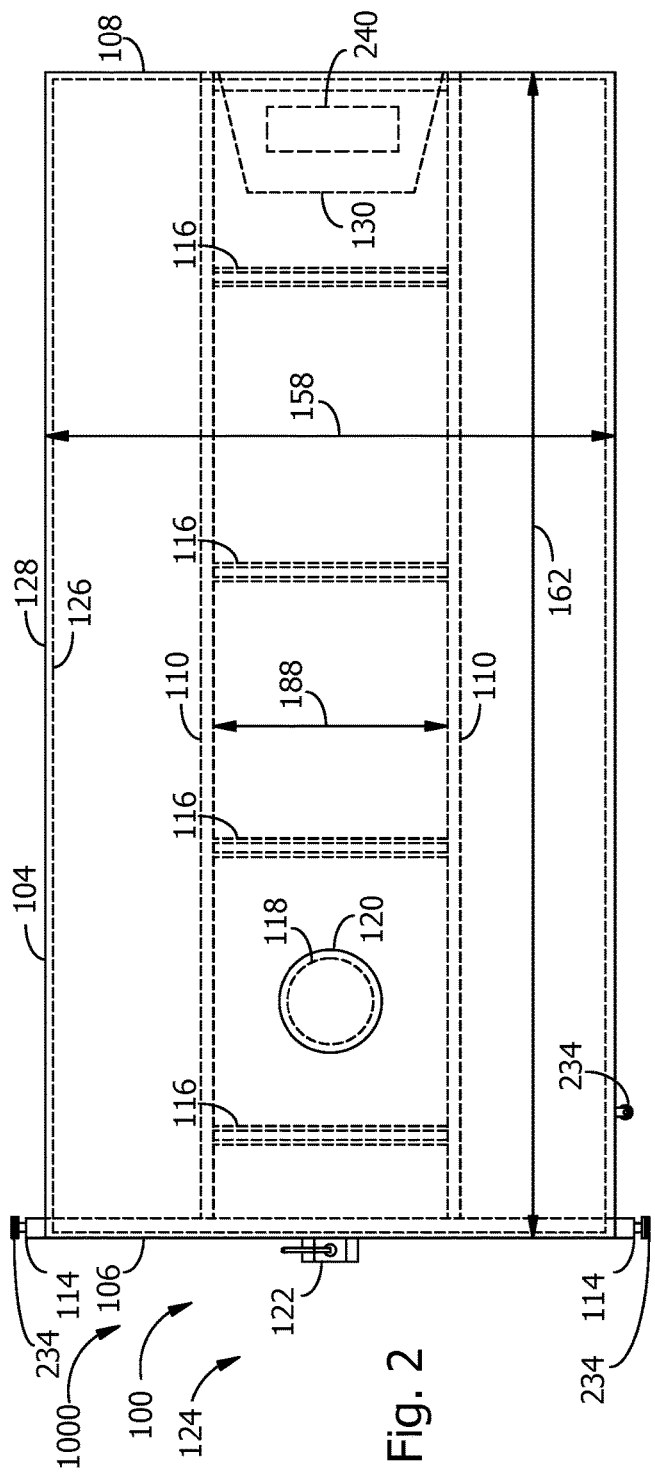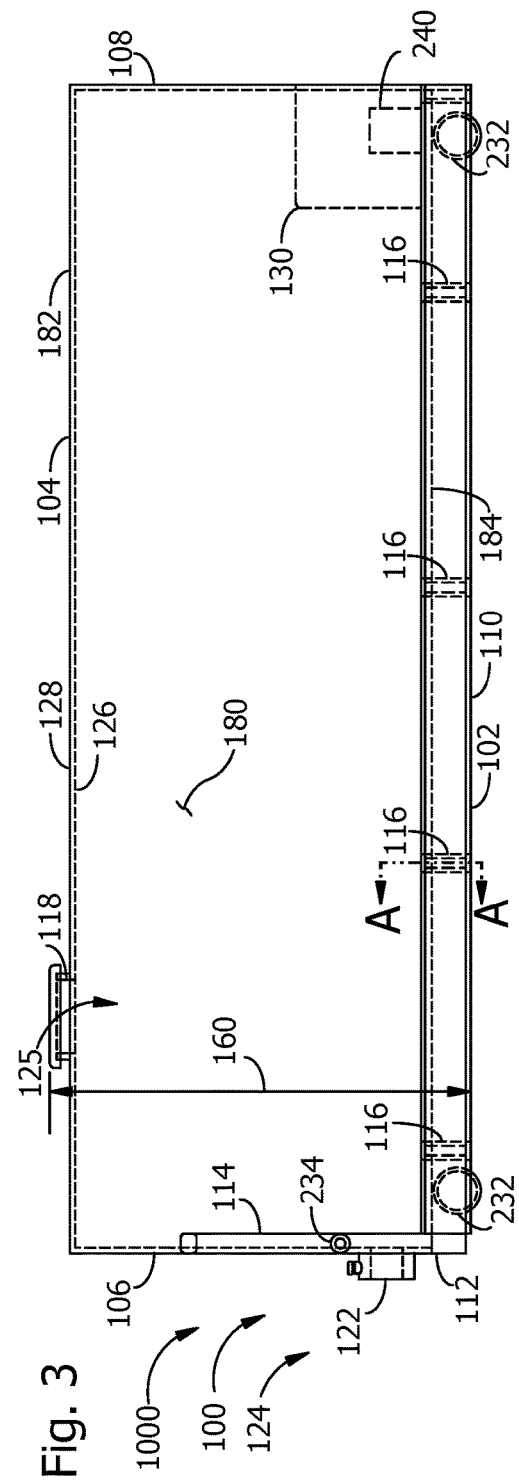

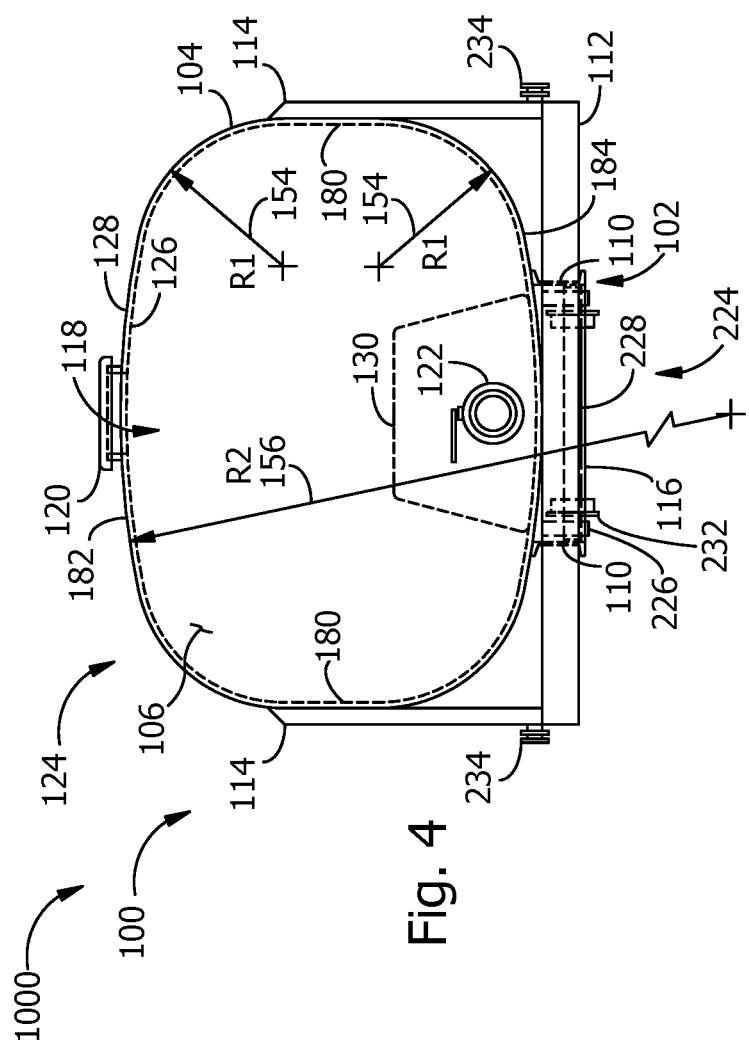
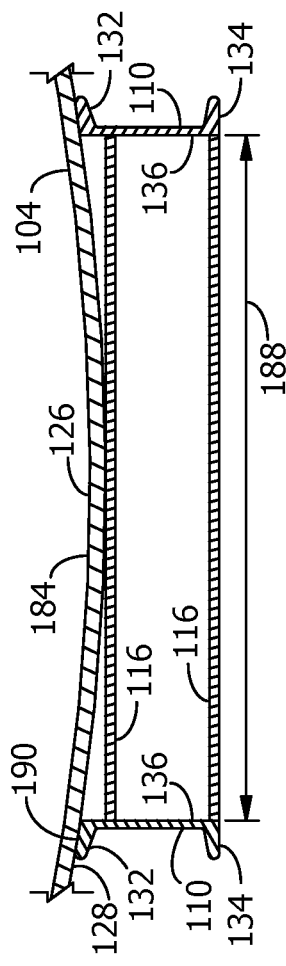

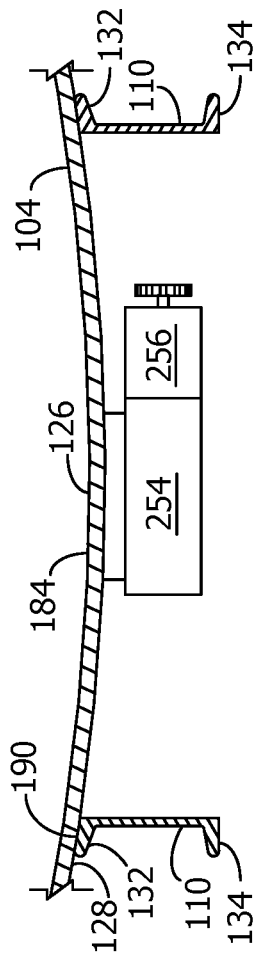
Fig. 5B  Alternative Section A - A
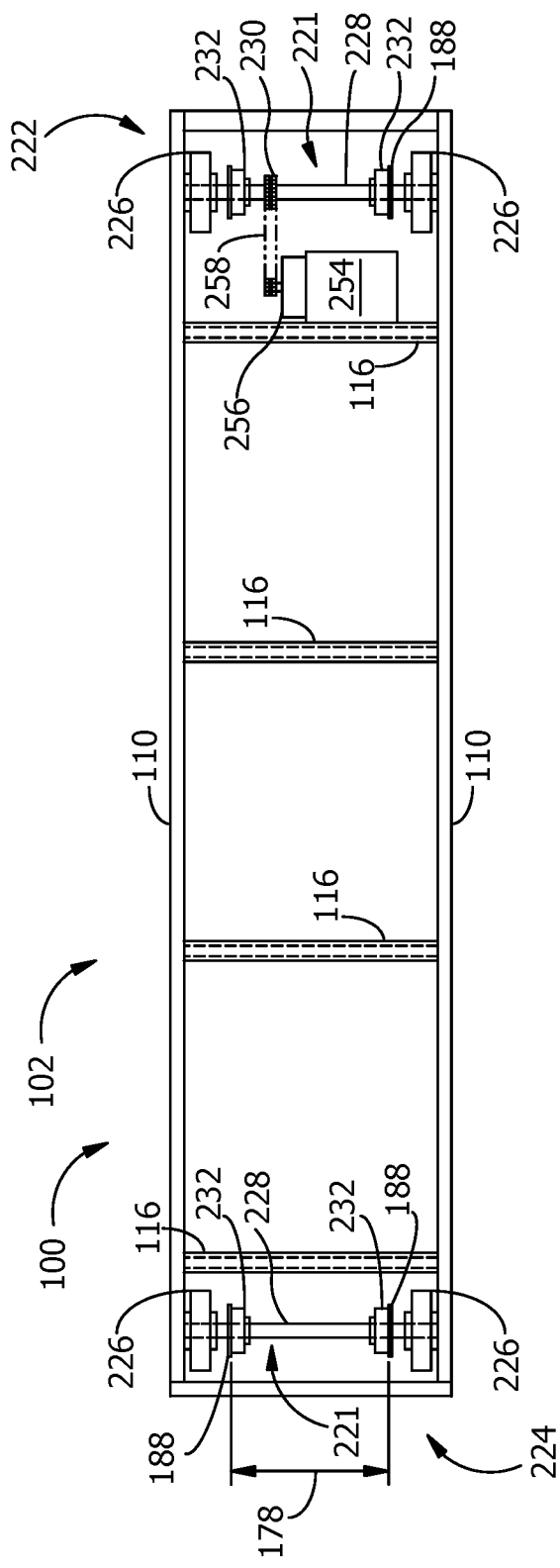
Fig. 6

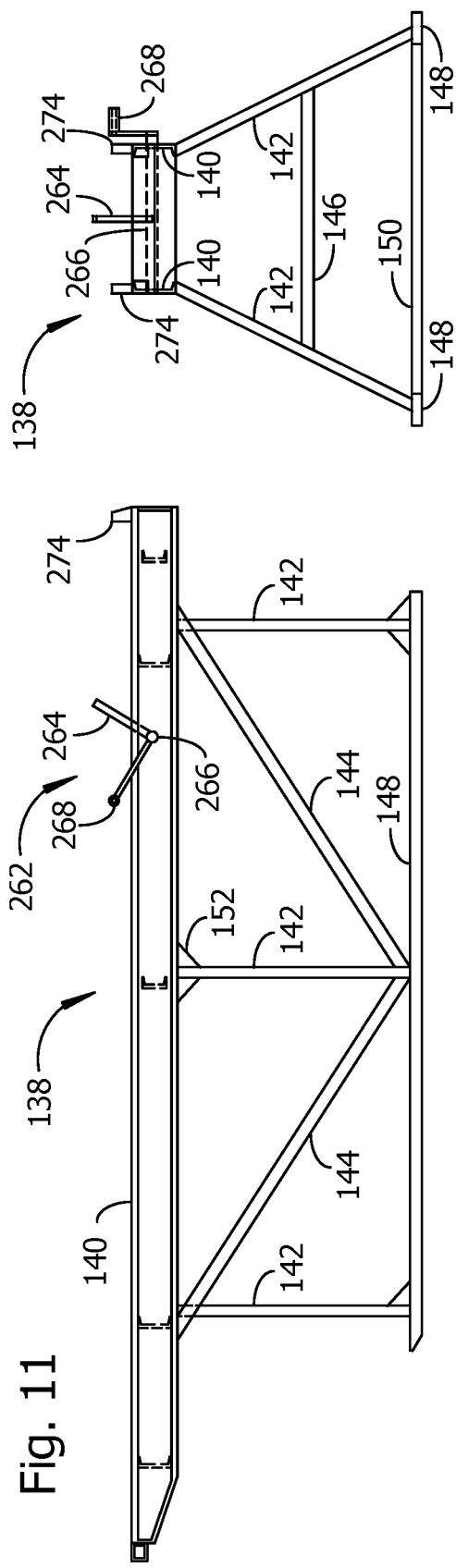
Fig. 11
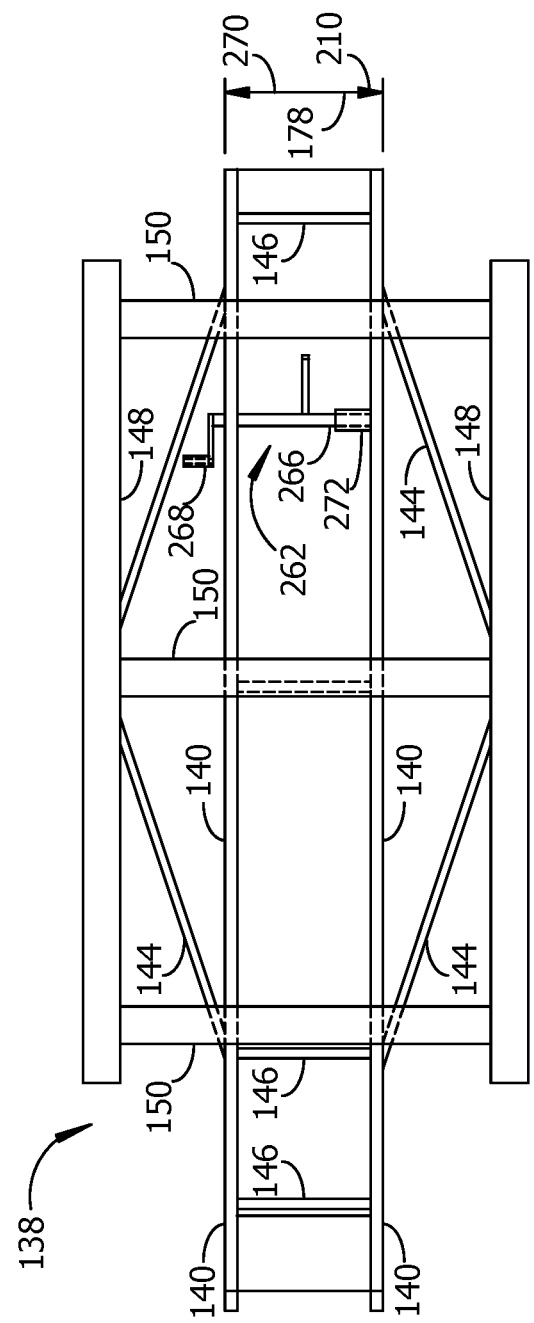
Fig. 12
Fig. 13

MOTORIZED LIQUID TRANSPORT AND STORAGE TANK FOR A TRANSFER DUMP TRUCK

FIELD OF THE INVENTION

The disclosed apparatus embodiments are related to transfer boxes for transfer dump trucks and to storage tanks for transporting and storing liquid payloads.

BACKGROUND

Tanker trucks and tanker trailers may be used to carry water or other liquid payloads to construction sites for use in dust suppression, mixing and curing concrete, and other purposes. Tanker trucks and tanker trailers may include a storage tank attached to a chassis supporting axles, tires, and equipment needed for loading and unloading liquid payloads from the storage tank, where a liquid payload refers to contents of the storage tank that are in a predominantly liquid state. A tanker truck or tanker trailer equipped to transport liquid payloads may be unsuitable for transporting payloads of predominantly solid material, for example sand, gravel, soil, and the like. It may be desirable to prevent residue from a payload from contaminating a subsequent payload. For example, a tanker truck that has been used to transport unpurified groundwater or river water, wastewater, liquid fertilizer, chemical solutions for dust suppression, insecticide, hydrocarbon liquids, or other substances unfit for human consumption, may not be usable for subsequent transport of potable water without potentially hazardous, labor-intensive cleaning. It may therefore be necessary to restrict some tankers to carrying specific payloads only and operate other tankers for other payloads, increasing the capital cost and operating costs of transporting liquid payloads.

A tanker truck may be driven for a relatively small number of hours per month when transporting liquid payloads for dust suppression, concrete mixing, and so on. At other times, the tanker truck may sit unused. Vehicle owners may have difficulty justifying purchase and maintenance of a tanker truck or tanker trailer that sits unused much of the time. In comparison to a tanker truck, a dump truck may make many trips to construction sites each day with many different kinds of loads, reducing the combined cost of ownership and operation per load compared to the cost of ownership and operation per load for a tanker truck.

A dump truck may have a dump body for carrying payloads comprising mostly solid material, for example sand, gravel, rock, and the like. The dump body may include a rotatable gate to prevent solid payload material from falling out the back of the dump body during transport. The gate may not seal sufficiently tightly against the dump body to prevent liquid in the dump body from leaking out the gate, so a storage tank may be lifted by an external crane or gantry into the dump body to enable transport of liquid payloads. When an external lifting device is unavailable, it may not be possible to place the storage tank in the dump body. Furthermore, the storage tank may not make efficient use of the volume of the dump body, wasting economically valuable payload volume and increasing operating costs per delivered load. For example, a cylindrical tank placed in a dump body with a rectangular deck and rectangular side walls leaves a large volume unfilled with payload around the outside of the tank, possibly increasing the number of trips needed to deliver a requested payload volume. A dump body formed with arcuate side and bottom deck surfaces joined to one another through large radii of curvature, sometimes referred to as an elliptical or semi-elliptical dump body, will also have substantial unused volume surrounding a rectangular tank or a cylindrical tank placed in the dump body.

SUMMARY

An example apparatus embodiment includes a motorized transfer tank for a transfer dump truck. The example motorized transfer tank includes a fluid reservoir having a tank wall enclosing an internal volume for holding a liquid payload; an electric motor attached to the motorized transfer tank; and a support frame attached to a bottom side of the fluid reservoir. The example support frame includes a first longitudinal frame member; a second longitudinal frame member; a gearbox driven by the electric motor; and a drive axle assembly rotatably coupled to the first longitudinal frame member and the second longitudinal frame member near a front end of the first longitudinal frame member. The drive axle assembly includes an axle assembly having a steel shaft; a first flanged steel wheel affixed to the steel shaft near a first end of the steel shaft; and a second flanged steel wheel affixed to the steel shaft near a second end of the shaft. The drive axle assembly further includes a drive sprocket affixed to the steel shaft of the axle assembly, with the drive sprocket rotatably coupled to the gearbox.

The example motorized transfer tank optionally further includes an electric storage battery; a motor controller electrically connected to the electric motor and the electric storage battery; a first electrical switch electrically connected to the motor controller, with a forward movement direction of the motorized transfer tank selectable by the first electrical switch; and a second electrical switch electrically connected to the motor controller, with a reverse movement direction of the motorized transfer tank selectable by the second electrical switch.

For a dump truck having an elliptical dump body, the tank wall is preferably formed with a first radius of curvature between a longitudinal arcuate top wall and a first longitudinal arcuate side wall of the tank wall, with the first radius of curvature in a range from 60 percent to 90 percent of a radius of curvature of the elliptical dump body. The tank wall may optionally be formed with a second radius of curvature for the longitudinal arcuate top wall in a range from four times to six times the radius of curvature of the elliptical dump body.

BRIEF DESCRIPTION OF THE DRAWINGS

FIG. 1 is a pictorial view toward the back end, top, and right side of an example embodiment of a motorized transfer tank, configured for loading and unloading without external equipment from a dump body on a transfer dump truck.

FIG. 2 is a view downward toward the top side of the example motorized transfer tank of FIG. 1.

FIG. 3 is view toward the right side of the example motorized transfer tank of FIG. 1 and FIG. 2.

FIG. 4 is a view toward the back end of the example motorized transfer tank of FIGS. 1-3.

FIG. 5A is a partial cross-sectional view A-A showing some details of an example support frame from the motorized transfer tank of FIGS. 1-4. A location and viewing direction for Section A-A is marked with a section line A-A in FIG. 3.

FIG. 5B is an alternative partial cross-sectional view A-A showing an alternative arrangement of an electric motor attached to a bottom exterior wall surface of the fluid reservoir.

FIG. 6 is a view downward onto the top sides of the frame members and axle assemblies included in an example support frame for the motorized transfer tank examples of the preceding figures.

FIG. 11 shows a side view of an example stationary tank stand capable of receiving and securely storing the motorized transfer tank embodiment of the preceding figures.

FIG. 12 shows a view toward the tapered end of the tank support beams included in the example stationary tank stand of FIG. 11.

FIG. 13 shows a view toward the bottom side of the skid plates and other structural members of the example stationary tank stand of FIGS. 11-12.

DESCRIPTION

Figure 7:
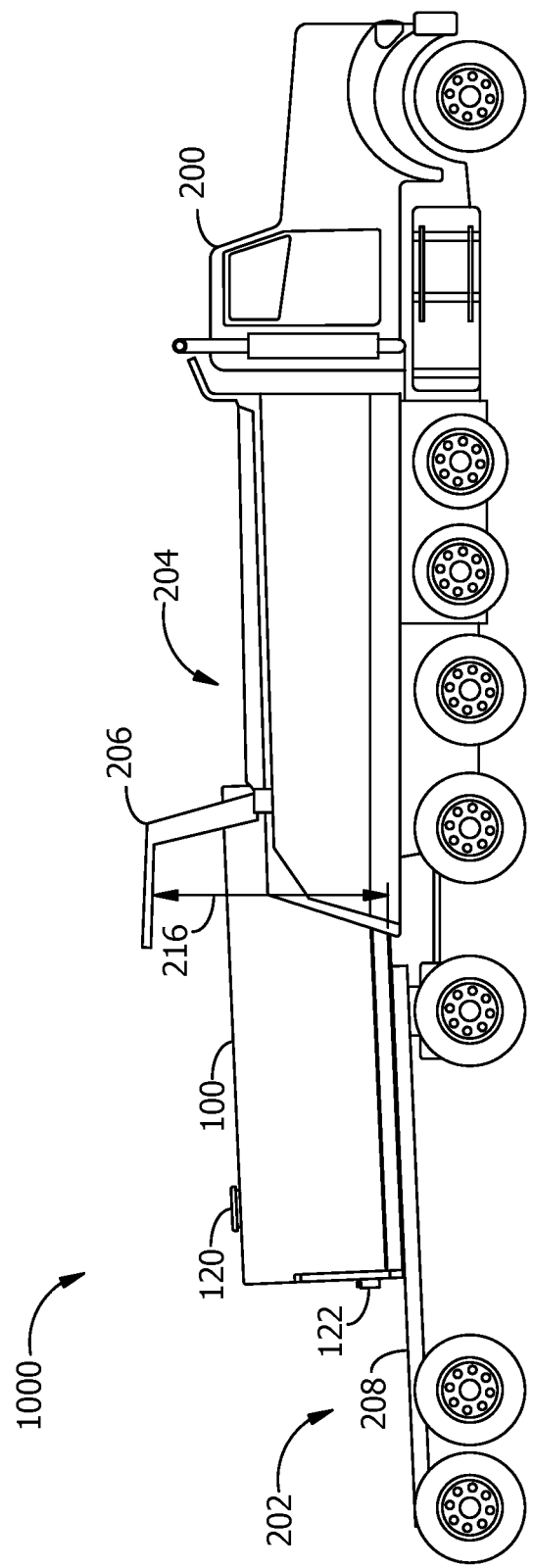
FIG. 7 shows a side view of a motorized transfer tank in accord with the disclosed embodiments, with the motorized transfer tank partly resting in the elliptical dump body of an example transfer dump truck and partly resting on a transfer trailer being pulled by the transfer dump truck.

A self-propelled transfer tank for transporting and storing liquid payloads, also referred to herein as a motorized transfer tank, is configured for moving itself onto and off of stationary tank stands and transfer trailers and into and out of dump bodies of transfer dump trucks without the use of external lifting, pushing, or pulling devices such as cranes, hoists, winches, hydraulic rams, and the like. The motorized transfer tank includes a fluid reservoir with exterior tank walls shaped for minimizing wasted space between the tank walls and interior surfaces of an elliptical dump body of a transfer dump truck. A support frame under the fluid reservoir includes one, and optionally two axle assemblies, each axle assembly fitted with two flanged metal wheels, and at least one of the axle assemblies driven by an electric motor powered from electric storage batteries carried aboard the motorized transfer tank. Torque produced by the electric motor is sufficient to propel the motorized transfer tank to and from the stationary tank stand, the dump body, and/or a transfer trailer with the fluid reservoir loaded to capacity.

Motorized transfer tanks in accord with the disclosed embodiments provide for the transport of liquid payloads aboard dump trucks and/or trailers originally configured for transporting payloads with a majority fraction of solid material. When not being used to transport or store liquid payloads, the motorized transfer tank may be unloaded from the transfer dump truck and/or the transfer trailer onto a stationary tank stand, allowing the trailer and dump truck to be used for transporting solid materials, for example solid materials carried in a transfer box.

As used herein, a liquid payload refers to a bulk material in a liquid physical state. A liquid payload may include a minority fraction of solid material, but preferably not so much solid material as to prevent the liquid payload from flowing readily from a storage vessel. Examples of a liquid payload suitable for use with the disclosed embodiments include, but are not limited to, unpurified water, potable water, liquid fertilizer, liquid wastewater, solutions of chemicals in water for dust control, suspensions of plant seeds in water, and so on. A solid payload refers to a bulk material in a solid physical state, for example, gravel, rock, sand, powdered or crushed material, bulk plant material, and so on. A solid payload may include a small fraction by volume of liquid.

A transfer dump truck is configured to receive a transfer box into the dump body of the dump truck. A dump body with a payload space formed by side walls smoothly curving through a large radius of curvature into the bottom of the payload space may be referred to as an elliptical dump body or alternately as a semi-elliptical dump body, in contrast to dump bodies having rectangular side walls joined along their bottom edges to a rectangular bottom surface to form a rectangular payload space. The interior bottom surface of the dump body may be referred to as the deck of the dump body. The transfer box and the dump body on the truck may each be fitted with a gate that can be opened and closed to load and unload payload material. The transfer dump truck may tilt the dump body to unload the payload from the dump body, return the dump body to its stowed position, push or pull the dump box from the transfer box support beams on the transfer trailer to the deck of the dump body using an electric winch or hydraulic ram, and tilt the dump body again to empty another payload from the transfer box. The driver may jackknife the trailer before raising the dump body to avoid dumping payload material onto the trailer. After the transfer box is emptied it may be pulled or pushed from the deck of the dump body onto the transfer box support beams on the transfer trailer.

The payloads carried in the dump body and transfer box may be different materials. The gates on the dump body and transfer box may not seal sufficiently tightly to prevent payload material in a liquid state from leaking out of the payload space. A transfer dump truck and transfer trailer enable more payload to be transported per trip and further enable different payloads to be carried in the dump body and transfer box to prevent cross-contamination of payloads.

An example motorized transfer tank 100 included in apparatus embodiments 1000 disclosed herein is shown in a pictorial view in FIG. 1. The example motorized transfer tank 100 includes a fluid reservoir 124 having a curved tank wall 104 joined to a vertical front wall 108 and a vertical rear wall 106. The enclosed internal volume 125 of the fluid reservoir 124 corresponds to the liquid payload capacity of the motorized transfer tank 100. When loaded into the dump body of a transfer dump truck, the front wall 108 faces toward the front end of the vehicle. When loaded onto a transfer trailer, the front wall 108 faces toward the rear of the tow vehicle. The curved tank wall 104 includes a longitudinal arcuate top wall 182 extending from the front wall 108 to the rear wall 106, a first longitudinal arcuate side wall 180 joined to the longitudinal arcuate top wall 182, the front wall, and the rear wall, a second longitudinal arcuate side wall 180 joined to the longitudinal arcuate top wall 182, the front wall, and the rear wall on a side laterally opposite the first longitudinally arcuate side wall 180, and a longitudinal arcuate bottom wall 184 joined to the first and second longitudinal arcuate side walls, the front wall, and the rear wall. The curved tank wall 104, front wall 108, and rear wall 106 establish the internal volume 125 of the fluid reservoir 124. The internal volume 125 establishes an upper limit for a volume of liquid payload material that may be carried in the fluid reservoir.

FIGS. 2, 3, 4, 5A, and 5B show additional example details of the fluid reservoir 124 and tank wall 104. As suggested in FIG. 2, a longitudinal separation distance 162 between outer surfaces of the front wall 108 and rear wall 106 corresponds to an external length dimension 162 of the fluid reservoir. The longitudinal arcuate top wall 182 joins to the first longitudinal arcuate side wall 180, forming an arcuate interior wall surface 126 having a first radius of curvature R1 154 between the top wall 182 and the side wall 180 and again between the side wall 180 and the bottom wall 184. The top wall 182 is preferably formed with a second radius of curvature R2 156 extending from the first side wall 180 to the laterally opposite second side wall 180. The bottom wall 184 may also be formed with the second radius of curvature R2 156.

An access port 118 on the top of the fluid reservoir 124 penetrates the exterior wall surface 128 and interior wall surface 126 of the curved tank wall 104 to establish fluid communication with the internal volume 125 of the fluid reservoir 124. The access port 118 may be positioned at any convenient location along the longitudinal arcuate top wall 182. The motorized transfer tank 100 includes an example access port cover 120 configured to close the access port 118 with a liquid-tight seal. Liquid payloads may be introduced into and removed from the fluid reservoir through the access port 118 and/or an example outlet valve 122 on the rear wall 106. Other pipes or hoses capable of carrying liquids may be in fluid communication with the fluid reservoir 124 through the access port 118 and/or outlet valve 122. When closed, the access port cover 120 prevents release of payload material from the fluid reservoir through the access port 118 and prevents debris, animals, or persons from accidently falling into the fluid reservoir. In some apparatus embodiments 1000, the access port cover may be remotely operable for opening and closing by electric or hydraulic actuators, as described for example in U.S. Pat. No. 8,070,009 to Mckenzie et al., incorporated herein by reference in its entirety, and U.S. Pat. No. 8,910,816 to Mckenzie et al., incorporated herein by reference in its entirety.

As shown in FIGS. 2-3, an example battery compartment 130 extends into the fluid reservoir 124 and through the front wall 108. One or more electric storage batteries 240 are positioned in the battery compartment 130 to power an electric motor and other equipment included with the motorized transfer tank 100. The battery compartment 130 is sealed off from contact with payload inside the fluid reservoir 124. The front end of the battery compartment may be closed by a door ore removable panel (not illustrated). The battery compartment preferably does not extend past the front wall 108 to reduce prospects for damage to batteries and other equipment installed in the battery compartment should the motorized transfer tank advance until it hits the front wall of a dump body on a dump truck.

A support frame 102 attached to the exterior wall surface 128 of the curved tank wall 104 supports the weight of the motorized transfer tank 100 and its payload, reduces flexure of the curved tank wall 104 while the motorized transfer tank 100 is moving from a transfer trailer to the dump body of a transfer dump truck or from the dump body to the trailer, and provides structural support for axles, wheels, batteries, and other components of the motorized transfer tank. As shown in FIGS. 1-6, the example support frame 102 includes two longitudinal frame members 110 attached to the longitudinal arcuate bottom wall 184. A first longitudinal frame member 110 is laterally separated from a second longitudinal frame member 110 by optional intervening transverse frame members 116.

In some embodiments 100, the longitudinal frame members 110 extend the full-length dimension 162 of the fluid reservoir 124 as suggested in the example of FIG. 2. In alternative embodiments, the longitudinal frame members may be made a different length than the length dimension 162 of the fluid reservoir.

Each of the longitudinal frame members 110 are formed with an angled top flange 132 having a top surface 190, a bottom flange 134, and a beam web 136, as shown for example in Section A-A in FIG. 5A. The top flange 132 is preferably formed at an angle greater than 90 degrees relative to the approximately vertical beam web to position the top surface 190 in tangential contact with the external wall surface 128 of the tank wall 104 as shown in the cross-section. The angled top flange maximizes the contact area between the top surface 190 and the longitudinal arcuate bottom wall 184, distributing the weight of the tank and its payload across the full length and width of the top surface 190 on the longitudinal frame members. The bottom flange extends away from the beam web at an approximately right angle.

The longitudinal frame members 110 and the optional transverse frame members 116 may be formed from flanged beams such as I-beams, C-beams, or H-beams. The transverse frame members may optionally be formed as hollow structural sections (HSS). A rear frame member 112 is joined to the ends of the longitudinal frame members. Two vertical frame members 114 are joined to the rear frame member 112 and to opposite lateral sides of the curved tank wall 104 and/or the rear wall 106. When loaded into the dump body of a truck, the rear frame member 112 and vertical frame members 114 may optionally be positioned outside the back end of the dump body.

In addition to supporting the weight of the fluid reservoir 124 and its payload, the support frame 102 provides mounting locations for one and optionally two axle assemblies 221 and other components of the motorized transfer tank 100. Each axle assembly 221 includes a steel shaft 228, a first flanged wheel 232 affixed to the steel shaft near a first end of the steel shaft, and a second flanged wheel 232 affixed to the steel shaft near a second end of the steel shaft. As suggested in the example of FIG. 6, a drive axle assembly 222 is attached to the support frame near a front end of the frame and an optional rear axle assembly 224 is attached near the back end of the support frame. The drive axle assembly 222 includes a first of the axle assembly 221 and the optional rear axle assembly 224 includes a second of the axle assembly 221.

Each axle assembly 221 is rotatably coupled to the support frame 102 by two pillow block bearings 226, a first pillow block bearing 226 strongly attached to a longitudinal frame member 110 and a second pillow block bearing 226 strongly attached to the laterally opposite longitudinal frame member 110. The steel shaft 228 is rotatably coupled to the first and second pillow block bearings. For the drive axle assembly 222, a drive sprocket 230 affixed to the steel shaft 228 engages with a closed-loop drive chain 258 driven in rotation by a gearbox 256. In an alternative embodiment, an output gear on the gearbox rotatably engages the drive sprocket 230, optionally through one or more intervening gears, and the drive chain is omitted.

The gearbox 256 is driven by an electric motor 254. In the example of FIG. 6, the electric motor 254 is strongly attached to one of the transverse frame members 116 of the support frame 102. In an alternative arrangement, the electric motor 254 and optionally the gearbox 256 are strongly attached to the tank wall 104 as shown in Alternative Section A-A in FIG. 5B. The electric motor generates sufficient torque to rotate the flanged wheels, steel shaft, and drive sprocket and move the motorized transfer tank 100 and a payload filling the tank into and out of a transfer dump truck without the use of other lifting, pushing, or pulling equipment.

An optional second axle assembly may optionally be arranged similar to the first drive axle assembly, including a drive sprocket for driving the second axle assembly from the electric motor. Alternatively, the second axle assembly omits the drive sprocket and chain or gear connections to the electric motor and may therefore be referred to as an undriven axle assembly. The flanged wheels on the undriven axles assembly are freely rotatable. An example of an undriven rear axle assembly 224 is shown in FIG. 6. In an alternative embodiment, the undriven axle assembly is replaced with one or more skid plates (not illustrated) attached to the support frame. In yet another alternative embodiment (not illustrated), the undriven axles assembly is omitted and flanged wheels are rotatably coupled to the longitudinal support beams.

FIG. 7 shows an example of a motorized transfer tank 100 embodiment in an intermediate position partially into the dump body of a transfer dump truck 200 and partly resting on top of the transfer box support beams 208 of a transfer trailer 202. In the example of FIG. 7, the gate 206 at the back end of the elliptical dump body 204 has been raised to admit the motorized transfer tank 100 as the tank moves under the influence of the electric motor 254 and drive axle assembly 222 in the support frame 102. FIG. 7 further represents an example of the electric motor 254, gearbox 256, and drive axle assembly 222 successfully moving the motorized transfer tank 100 from the transfer trailer 202 to the dump truck 200 or from the dump truck to the transfer trailer without the use of other lifting, pushing, or pulling equipment such as cranes, hoists, winches, hydraulic rams, and the like.

The example motorized transfer tank embodiments 100 enable a transfer dump truck 200 to simultaneously transport a solid payload in the dump body and a liquid payload in the motorized transfer tank 100. For example, the motorized transfer tank 100 may be loaded onto the transfer trailer and filled with water or other liquid needed at a construction site. The dump body may be filled with a solid payload needed at the construction site. The liquid and solid payloads can be transported together to the construction site without cross-contamination of the payloads, where the dump body may be emptied without disconnecting the transfer trailer. Alternately, the motorized transfer tank 100 may be loaded into the dump body 204, transported to the construction site by the transfer dump truck 200, and after delivering water to the construction site, moved onto the transfer trailer 202 to permit the dump body 204 to be filled with solid material to be removed from the construction site. Furthermore, an equipment operator may procure more than one motorized transfer tank 100, reserving each tank for use with a different composition of liquid payload to avoid cross-contamination, at substantially less capital expense and operating expense than maintaining multiple tanker trucks or tanker trailers.

Figure 8:
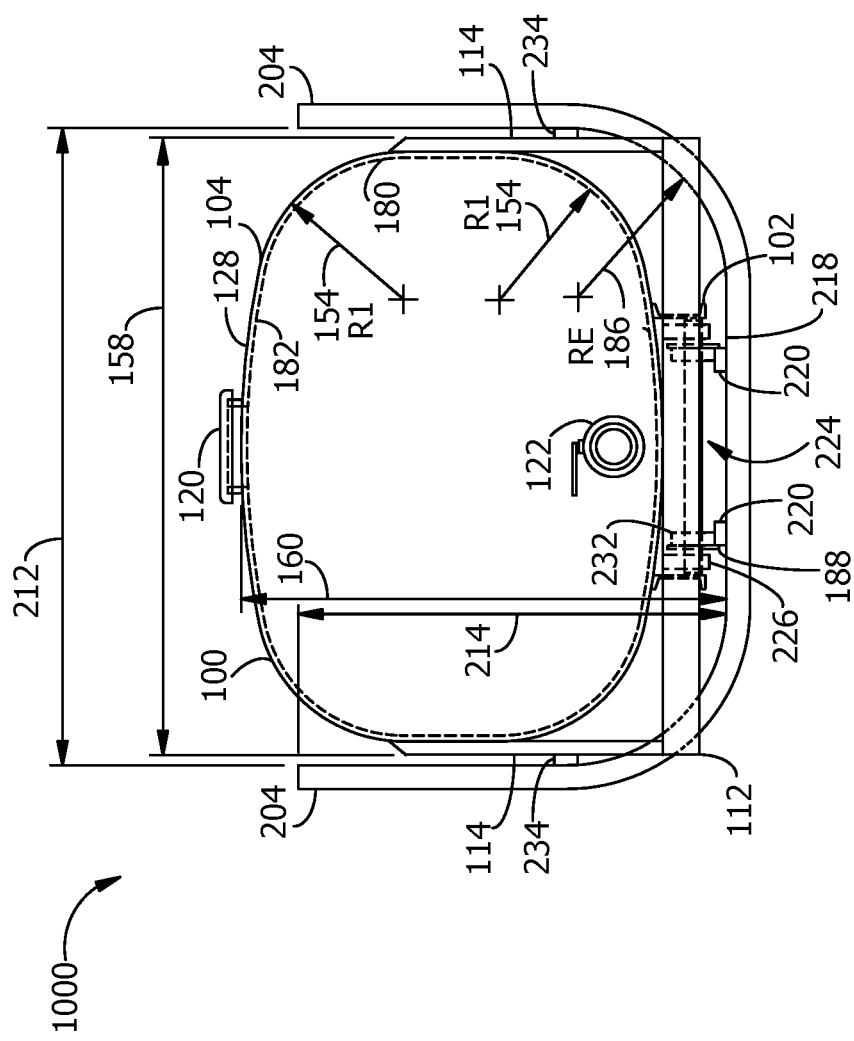
FIG. 8 shows an end view of the example motorized transfer tank of the previous figures loaded for transport in the elliptical dump body of a transfer dump truck.

As suggested in the example of FIG. 8, the flanges 188 of the flanged wheels 232 ride along the edges of track bars 220 affixed to and extending upward from the dump body deck 218 of the transfer dump truck. The circumferential rolling surface of each flanged wheel rides along the top surface of the track bars 220. An embodiment 100 is optionally further provided with at least two cam followers 234, one of each cam follower attached for example to vertical frame members 114 on opposite lateral sides of the fluid reservoir, which may engage with hooked arms (not illustrated) in the dump body of a transfer dump truck to prevent the motorized transfer tank from rolling backwards out the rear of the dump body when the vehicle accelerates or travels on an inclined surface.

To optimize payload transport efficiency and reduce operating costs, it may be preferable to provide external dimensions for the motorized transfer tank 100 that fill as much of the cargo volume of the dump body as possible. As shown in FIG. 8, the example dump body 204 has an interior height dimension 214 from the lowest part of the deck 218 to the top of the dump body sides walls and an interior width dimension 212 in a transverse direction between the opposing vertical side walls of the dump body. The tank external width 158 is preferably slightly less, for example up to about five percent less, than the interior width dimension 212 of the dump body to provide clearance for the cam followers 234 extending outward from vertical frame members 114 toward the interior surface of the dump body. The tank external height 160 can be shorter than the interior height dimension 214 but will preferably be greater than the interior height dimension 214 and less than the maximum unobstructed payload height 216 through the open gate 206 (ref. FIG. 7).

The arcuate profile of the tank wall makes efficient use of the available volume in an elliptical dump body, as suggested in the example of FIG. 8. FIG. 8 further shows an example of a radius of curvature RE 186 between a side of the elliptical dump body 204 and the interior bottom surface 218 of the dump body. For an elliptical dump body 204 formed with a radius of curvature RE 186 having a specific measured numerical value, the tank wall will preferably be formed with the first radius of curvature R1 154 in a range from about 0.6 RE to about 0.9 RE. The tank wall will further preferably be formed with the second radius of curvature R2 in a range from about 4 RE to about 6 RE.

Figure 9:
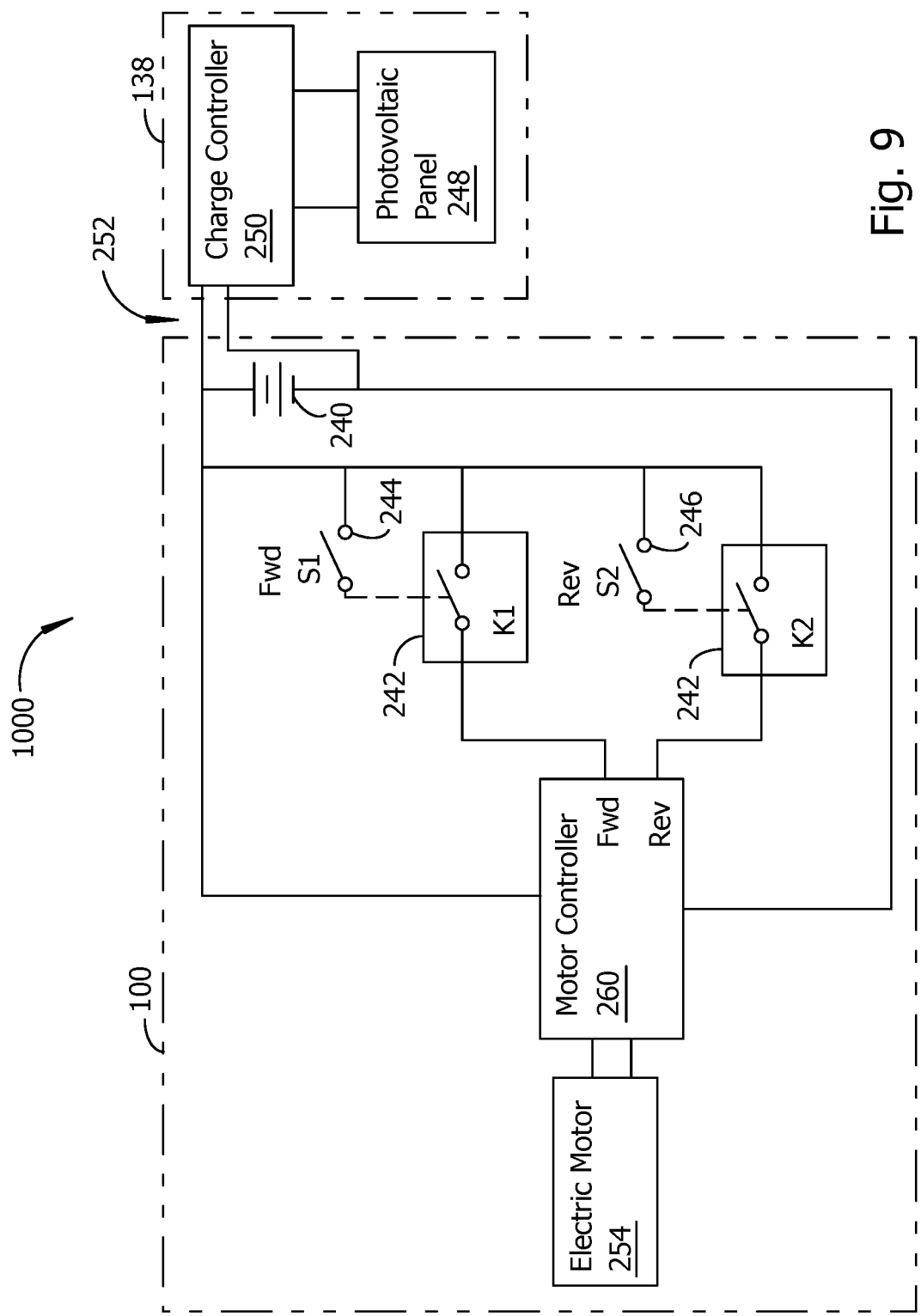
FIG. 9 shows a block diagram of electrical components and electrical connections included in some example apparatus embodiments.

The direction of rotation of the mechanical output from the electric motor 254 and gearbox 256 is reversible in response to activation of switches and relays to enable the direction of movement of the motorized transfer tank 100 to be selected by a person operating an embodiment 100. Examples of electrical components and electrical connections are shown in FIG. 9. An electric storage battery 240 preferably located in the battery compartment 130 of the motorized transfer tank 100 provides electrical energy in the form of direct current voltage and current to other components. A person operating an embodiment 100 can select a "forward" (Fwd) direction of movement of the motorized transfer tank by activating a Fwd select switch S1 244 or a "reverse" (Rev) direction of movement by activating a Rev select switch S2 246.

Switches S1 and S2 may be positioned at any convenient location on a motorized transfer tank 100, for example on the vertical frame members 114 at the back end of the fluid reservoir. "Forward" may correspond to the motorized transfer tank 100 propelling itself into a dump body and "reverse" may correspond to the motorized transfer tank propelling itself out of the dump body. Switch S1 activates a first high-current relay 242 K1 connected to couple current and voltage from the battery 240 to a "Fwd" input of a motor controller 260. Switch S2 activates a second high current relay 242 K2 connected to couple current and voltage from the battery 240 to a "Rev" input of the motor controller. Upon receiving current and voltage from either K1 or K2 in response to closure of switches S1 or S2, the motor controller 260 transmits voltage and current to the electric motor 254 as needed to establish the selected direction of motor rotation and the corresponding direction of motorized transfer tank movement.

In some embodiments of a motorized transfer tank 100, relays K1 and K2 are located in the battery compartment 130, although other locations on the motorized transfer tank may be used. In some embodiments, the motor controller 260 is also located in the battery compartment. In some embodiments, the motor controller is integrated into the electric motor 254.

The electric storage battery 240 may be recharged from the electrical system of the dump truck. The battery may optionally be recharged from a photovoltaic panel 248 and charge controller 250 connected to the battery through an intervening charging cable 252. For an embodiment 1000 including a motorized transfer tank 100 and a stationary tank stand 138, the charge controller 250 and photovoltaic panel 248 may be attached to the stationary tank stand so that the battery may be recharged when the motorized transfer tank 100 is stored on the stationary tank stand.

Figure 10:
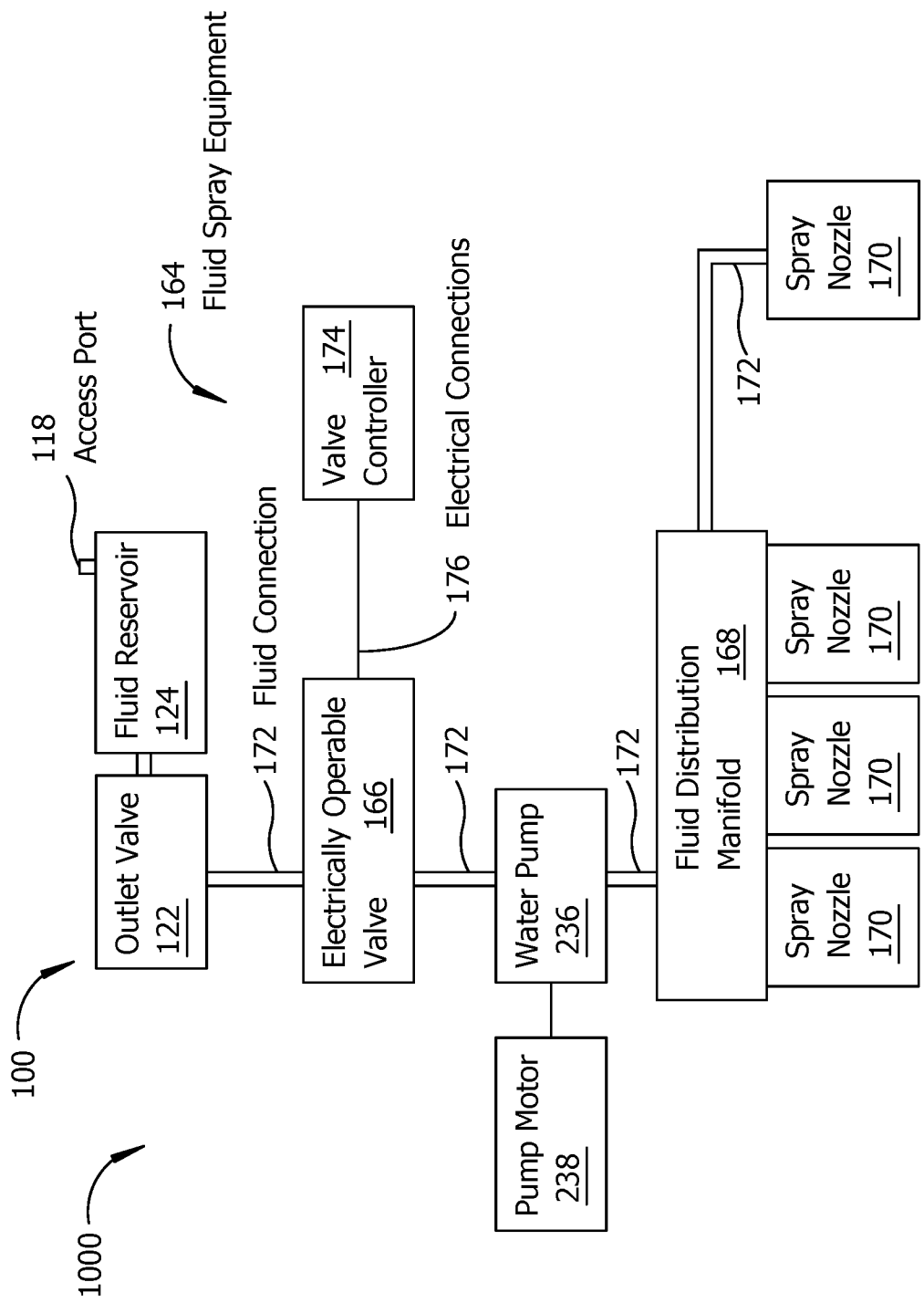
FIG. 10 is an example block diagram representing components, fluid connections, and electrical connections included with optional liquid spray equipment attachable to the motorized transfer tank.
Figure 14:
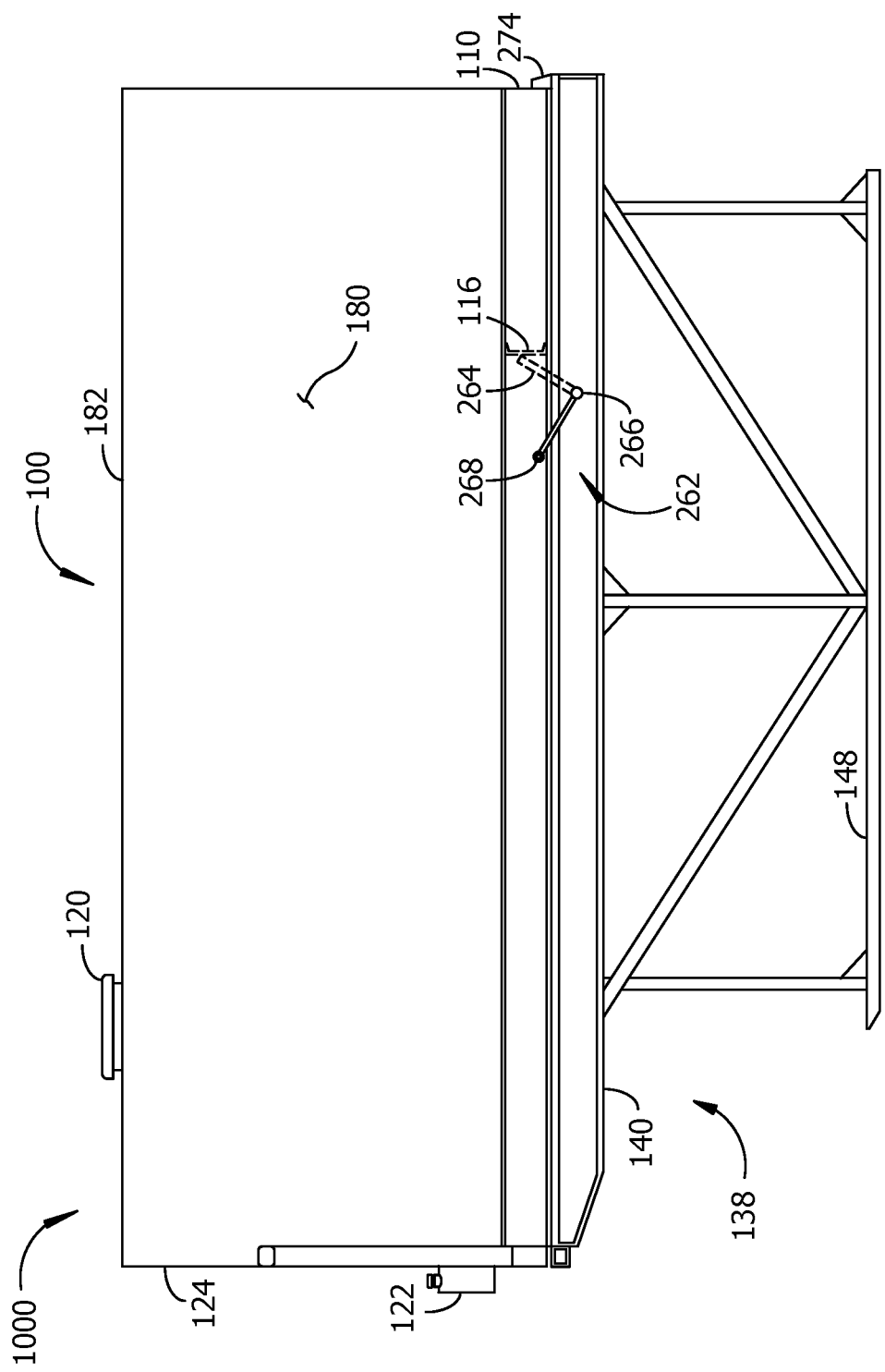
FIG. 14 shows the example motorized transfer tank embodiment on top of the tank support beams of the stationary tank stand of FIGS. 11-13, further illustrating an example of a spring-loaded safety latch holding the motorized transfer tank firmly against bumpers at the ends of the tank support beams.

An apparatus embodiment 1000 optionally includes fluid spray equipment 164 removably coupled to the motorized transfer tank 100. A schematic diagram of example components and fluid, mechanical, and electrical connections is shown in FIG. 10. As shown in the example of FIG. 10, an electrically operable valve 166 is coupled to the outlet valve 122 of the motorized transfer tank 100 by an intervening fluid connection 172. The fluid connection 172 includes hose, piping, and/or coupling fittings needed to establish fluid-tight liquid transfer between the coupled components. The electrically operable valve 166 is connected for electrical signal communication with a valve controller 174 through intervening electrical connections 176. The valve controller 174 commands the electrically operable valve 166 to open and close to manage the flow of liquid through the fluid spray equipment.

Liquid passing through the valve 166 enters a water pump 236, where fluid pressure is increased by the pump to deliver liquid at increased pressure to a fluid distribution manifold 168. The water pump 236 receives mechanical power from a pump motor 238 which may be implemented with an electric motor or a hydraulic motor. The fluid distribution manifold 168 is coupled to the water pump 236 through an intervening fluid connection 172. The fluid distribution manifold distributes liquid under pressure to one or more spray nozzles 170 mechanically connected to and in fluid communication with the fluid distribution manifold. Additional optional spray nozzles 170 may be positioned on the dump truck away from the fluid distribution manifold, for example along the sides or front of the vehicle, and coupled through fluid connections 172 to the fluid distribution manifold. The valve controller optionally includes control switches positioned within convenient reach of a person driving the transfer dump truck 200.

When not in use, motorized transfer tank 100 may be stored separately from the transfer dump truck 200, permitting the truck to be used for other payloads. Some embodiments 1000 therefore include a motorized transfer tank 100 and an optional stationary tank stand 138. An example stationary tank stand 138 is shown in FIGS. 11-14. The stationary tank stand 138 includes two parallel longitudinal tank support beams 140 positioned to receive the flanged wheels 232 of the motorized transfer tank 100. The tank support beams 140 are joined to one another by intervening transverse brace beams 146. The tank support beams are elevated to a preferred height for accepting a motorized transfer tank 100 in a transfer operation from a dump track by legs 142 and diagonal braces 144 attached to the tank support beams and to longitudinal foot plates 148. Gusset plates 152 may be included to strengthen welded connections between tank support beams, legs, and diagonal braces. The longitudinal foot plates 148 may be joined to one another by intervening transverse foot plates 150. The longitudinal foot plates 148 and transverse foot plates 150 distribute the weight of the stationary tank stand 138 and a loaded motorized transfer tank 100 across surfaces such as gravel, sand, or earth.

A spring-loaded safety latch 262 on the stationary tank stand 138 engages with a transverse frame member 116 in the support frame 102 of the motorized transfer tank 100 to prevent the tank from rolling off the stand when the tank support beams 140 are not level, for example when the tank stand is placed on a sloped surface. An example spring-loaded safety latch 262 is shown in FIGS. 11, 12, 13, and 14. A shaft 266 is rotatably coupled to one, and optionally both, tank support beams 140 on the stationary tank stand. A post 264 extends outward from the shaft 266 at an approximate right angle to the longest axis of the shaft. One end of the shaft 266 extends through a tank support beam 140 and is strongly attached to a handle 268. Turning the handle 268 rotates the shaft 266, raising and lowering the outer end of the post 264 relative to the top surface of the tank support beams 140. A spring 272 coupled to the shaft 266 and tank support beam 140 is arranged to rotate the post 264 upward when the handle 268 is released.

The flanged wheels 232 on the motorized transfer tank 100 guide the tank along the tank support beams 140 as the motorized transfer tank is driven along the beams by the electric motor 254 and the drive axle assembly 222. The front end of the support frame 102 comes into contact with the post 264 of the spring-loaded safety latch 262, rotating the post and shaft 266 against the force of the spring 272. The motorized transfer tank 100 stops advancing when it contacts bumpers 274 affixed at the ends of the tank support beams 140, and the post 264 rotates upward under the influence of the spring 272 until the post presses against a vertical side of one of the transverse frame members 116 in the support frame 102, as shown for example in FIG. 14. The force exerted by the spring 272 and post 264 against the transverse frame member 116 is sufficient to hold the motorized transfer tank 100 against the bumpers 274 when the electric motor 254 is turned off, preventing the motorized transfer tank from rolling off the tank support beams. Turning the handle 268 rotates the post 264 away from the transverse frame member 116, allowing the motorized transfer tank 100 to move away from the bumpers and off the stationary tank stand 138.

As suggested in FIG. 13, an outside lateral separation distance 270 for the tank support beams 140 is preferably the same as a lateral separation distance 178 between flanges 188 of the flanged wheels 232 (ref. FIG. 6) and the lateral separation distance 210 on the transfer box support beams 208 of the transfer trailer. Maintaining the preferred lateral separation between support beams enables the flanged wheels to track along the support beams while resisting movement of the motorized transfer tank laterally away from the support beams.

Unless expressly stated otherwise herein, ordinary terms have their corresponding ordinary meanings within the respective contexts of their presentations, and ordinary terms of art have their corresponding regular meanings.

What is claimed is:

1. A motorized transfer tank for a transfer dump truck, comprising:
   a fluid reservoir comprising a tank wall enclosing an internal volume for holding a liquid payload;
   an electric motor attached to said motorized transfer tank; and
   a support frame attached to a bottom side of said fluid reservoir, comprising:
      a first longitudinal frame member;
      a second longitudinal frame member;
      a gearbox driven by said electric motor; and
      a drive axle assembly rotatably coupled to said first longitudinal frame member and said second longitudinal frame member near a front end of said first longitudinal frame member, said drive axle assembly comprising:
         an axle assembly comprising:
            a steel shaft;
            a first flanged steel wheel affixed to said steel shaft near a first end of said steel shaft; and
            a second flanged steel wheel affixed to said steel shaft near a second end of said steel shaft; and
         a drive sprocket affixed to said steel shaft of said axle assembly, said drive sprocket rotatably coupled to said gearbox.

2. The motorized transfer tank of claim 1, further comprising:
   an electric storage battery;
   a motor controller electrically connected to said electric motor and said electric storage battery;
   a first electrical switch electrically connected to said motor controller, a forward movement direction of said motorized transfer tank selectable by said first electrical switch; and
   a second electrical switch electrically connected to said motor controller, a reverse movement direction of said motorized transfer tank selectable by said second electrical switch.

3. The motorized transfer tank of claim 1, said fluid reservoir comprising:
   a vertical front wall attached to said tank wall at a first end of said tank wall;
   a vertical rear wall attached to said tank wall at a second end of said tank wall at a second end of said tank wall longitudinally opposite said first end;
   said tank wall comprising:
      a longitudinal arcuate top wall extending from said front wall to said rear wall;
      a first longitudinal arcuate side wall joined to said longitudinal arcuate top wall, said front wall, and said rear wall;
      a second longitudinal arcuate side wall joined to said longitudinal arcuate top wall, said front wall, and said rear wall on a side laterally opposite said first longitudinal arcuate side wall; and
      a longitudinal arcuate bottom wall joined to said first longitudinal arcuate side wall, said second longitudinal arcuate side wall, said front wall, and said rear wall, with a fluid reservoir formed by said tank wall, said front wall, and said rear wall; and
   an outlet valve attached to said rear wall, said outlet valve in fluid communication with said internal volume of said fluid reservoir.

4. The motorized transfer tank of claim 3, further comprising an access port formed in said longitudinal arcuate top wall, said access port in fluid communication with said internal volume of said fluid reservoir.

5. The motorized transfer tank of claim 3, further comprising a watertight battery compartment attached to said front wall, said watertight battery compartment extending into said fluid reservoir.

6. The motorized transfer tank of claim 3, said dump tuck having an elliptical dump body, and said tank wall formed with a first radius of curvature between said longitudinal arcuate top wall and said first longitudinal arcuate side wall in a range from 60 percent to 90 percent of a radius of curvature of said elliptical dump body.

7. The motorized transfer tank of claim 6, said tank wall formed with a second radius of curvature for said longitudinal arcuate top wall in a range from four times to six times said radius of curvature of said elliptical dump body.

8. The motorized transfer tank of claim 6, said first longitudinal frame member formed with an angled top flange having a top surface in tangent contact with said exterior surface of said longitudinal arcuate bottom wall.

9. The motorized transfer tank of claim 3, further comprising:
   an electrically operable valve in fluid communication with said outlet valve through an intervening fluid connection;
   a valve controller electrically connected for signal communication with said electrically operable valve;
   a fluid distribution manifold in fluid communication with said electrically operable valve; and
   a spray nozzle affixed to and in fluid communication with said fluid distribution manifold.

10. The motorized transfer tank of claim 9, further comprising an additional plurality of said spray nozzle attached to and in fluid communication with said fluid distribution manifold.

11. The motorized transfer tank of claim 10, further comprising another of said spray nozzle in fluid communication with said fluid distribution manifold through an intervening fluid connection.

12. The motorized transfer tank of claim 1, further comprising a stationary tank stand comprising:
   a first tank support beam;
   a second tank support beam laterally separated from said first tank support beam by an intervening transverse brace beam;
   a first longitudinal foot plate joined to said first tank support beam by an intervening leg and a diagonal brace; and
   a second longitudinal foot plate joined to said second tank support beam by another intervening leg and another diagonal brace.

13. The motorized transfer tank of claim 12, further comprising:
   a bumper affixed at an end of said first tank support beam; and
   a spring-loaded safety latch rotatably coupled to said first tank support beam.

14. The motorized transfer tank of claim 13, said spring-loaded safety latch further comprising:
   a shaft rotatably coupled to said first tank support beam and said second tank support beam;
   a post extending away from said shaft; and
   a spring coupled to said first tank support beam and said shaft, said post rotatable upwards under influence of said spring, said spring exerting sufficient force to hold said motorized transfer tank against said bumper.

15. The motorized transfer tank of claim 1, further comprising a drive chain rotatably coupling said gearbox to said drive sprocket.

16. The motorized transfer tank of claim 1, further comprising a rear axle assembly rotatably coupled to said first longitudinal frame member and said second longitudinal frame member near a back end of said first longitudinal frame member, said rear axle assembly comprising a second of said axle assembly.

17. The motorized transfer tank of claim 1, further comprising:
a transverse frame member joined to said first longitudinal frame member and said second longitudinal frame member; and
said electric motor attached to said transverse frame member.

18. The motorized transfer tank of claim 1, wherein said electric motor is attached to said tank wall.

19. A motorized transfer tank for a transfer dump truck, comprising:
a fluid reservoir comprising a tank wall enclosing an internal volume for holding a liquid payload;
an electric motor attached to said motorized transfer tank; and
a support frame attached to said fluid reservoir, comprising:
a first longitudinal frame member;
a second longitudinal frame member;
a gearbox driven by said electric motor;
a drive axle assembly rotatably coupled to said first longitudinal frame member and said second longitudinal frame member near a front end of said first longitudinal frame member, said drive axle assembly comprising:
a steel shaft;
a first flanged steel wheel affixed to said steel shaft near an end of said steel shaft;
a second flanged steel wheel affixed to said steel shaft near an opposite end of said steel shaft; and
a drive sprocket affixed to said steel shaft of said axle assembly, said drive sprocket rotatably coupled to said gearbox; and
a stationary tank stand comprising:
a first tank support beam;
a second tank support beam laterally separated from said first tank support beam by an intervening transverse brace beam;
a first longitudinal foot plate joined to said first tank support beam by an intervening leg and a diagonal brace; and
a second longitudinal foot plate joined to said second tank support beam by another intervening leg and another diagonal brace.

\* \* \* \* \*